(12) United States Patent
Inamura et al.

(10) Patent No.: US 8,795,513 B2
(45) Date of Patent: Aug. 5, 2014

(54) HYDROCRACKING CATALYST FOR HEAVY OIL AND METHOD FOR HYDROTREATING HEAVY OIL USING SAME

(75) Inventors: Kazuhiro Inamura, Chiba (JP); Akira Iino, Chiba (JP); Nobuyuki Takahashi, Chiba (JP); Yoji Sunagawa, Chiba (JP); Mitsunori Watabe, Fukuoka (JP); Yuichi Yamahata, Fukuoka (JP); Shinya Eura, Fukuoka (JP); Yuji Shirahama, Fukuoka (JP)

(73) Assignee: JGC Catalysts and Chemicals Ltd., Kanagawa (JP)

( * ) Notice: Subject to any disclaimer, the term of this patent is extended or adjusted under 35 U.S.C. 154(b) by 238 days.

(21) Appl. No.: 13/261,168

(22) PCT Filed: Aug. 2, 2010

(86) PCT No.: PCT/JP2010/063010
§ 371 (c)(1),
(2), (4) Date: Apr. 13, 2012

(87) PCT Pub. No.: WO2011/016413
PCT Pub. Date: Feb. 10, 2011

(65) Prior Publication Data
US 2012/0193270 A1 Aug. 2, 2012

(30) Foreign Application Priority Data
Aug. 3, 2009 (JP) .................. 2009-180946

(51) Int. Cl.
| | |
|---|---|
| C10G 47/16 | (2006.01) |
| C10G 47/20 | (2006.01) |
| B01J 29/06 | (2006.01) |
| B01J 29/064 | (2006.01) |
| B01J 29/16 | (2006.01) |
| B01J 35/10 | (2006.01) |
| B01J 37/02 | (2006.01) |
| B01J 37/20 | (2006.01) |
| C10G 47/18 | (2006.01) |
| B01J 29/10 | (2006.01) |
| B01J 29/076 | (2006.01) |

(52) U.S. Cl.
CPC .............. *C10G 47/18* (2013.01); *B01J 229/42* (2013.01); *B01J 35/1042* (2013.01); *B01J 35/1061* (2013.01); *B01J 35/1038* (2013.01); *B01J 35/1023* (2013.01); *B01J 35/1019* (2013.01); *B01J 37/0203* (2013.01); *C10G 47/20* (2013.01); *B01J 37/20* (2013.01); *B01J 29/064* (2013.01); *B01J 35/108* (2013.01); *B10J 37/0009* (2013.01); *B01J 29/106* (2013.01); *B01J 29/166* (2013.01); *B01J 29/076* (2013.01)

USPC ............. 208/110; 208/46; 208/108; 208/109; 502/60; 502/63; 502/64; 502/66; 502/70

(58) Field of Classification Search
CPC .... B01J 2229/42; B01J 29/064; B01J 29/076; B01J 29/106; B01J 29/166; B01J 35/1019; B01J 35/1023; B01J 35/1038; B01J 35/1042; B01J 35/1061; B01J 35/108; B01J 37/0009; B01J 37/0203; B01J 37/20
USPC .................. 208/46, 106, 107, 108, 109, 110; 502/60, 63, 64, 66, 70
See application file for complete search history.

(56) References Cited

U.S. PATENT DOCUMENTS

| | | | |
|---|---|---|---|
| 5,800,797 | A | 9/1998 | Matsumoto et al. |
| 6,174,429 | B1 | 1/2001 | George-Marchal et al. |
| 2002/0011429 | A1 | 1/2002 | Iino et al. |
| 2005/0197249 | A1 | 9/2005 | Creyghton et al. |

FOREIGN PATENT DOCUMENTS

| | | |
|---|---|---|
| EP | 2258476 A1 | 12/2010 |
| JP | 10-128121 A | 5/1998 |
| JP | 11-192437 A | 7/1999 |
| JP | 2007-526119 A | 9/2007 |
| JP | 2008-297471 A | 12/2008 |
| JP | 2009-160496 A | 7/2009 |

OTHER PUBLICATIONS

Supplemental European Search Report EP Application No. 10806412 dated Feb. 26, 2013.

*Primary Examiner* — Walter D Griffin
*Assistant Examiner* — Derek Mueller
(74) *Attorney, Agent, or Firm* — Foley & Lardner LLP

(57) ABSTRACT

Provided is a catalyst for hydrocracking of heavy oil which is excellent in both functions of cracking activity and desulfurization activity with respect to heavy oil by striking a balance between the cracking activity and desulfurization activity and which includes a support including a crystalline aluminosilicate and a porous inorganic oxide excluding the crystalline aluminosilicate, with an active metal being supported on the support, in which (a) the support includes the crystalline aluminosilicate in an amount of 45% by mass or greater and smaller than 60% by mass and the porous inorganic oxide excluding the crystalline aluminosilicate in an amount of greater than 40% by mass and 55% by mass or smaller, based on the sum of an amount of the crystalline aluminosilicate and an amount of the porous inorganic oxide excluding the crystalline aluminosilicate, (b) the active metal is at least one kind of metal selected from metals belonging to Groups 6, 8, 9, and 10 of the Periodic Table, and (c) the catalyst for hydrocracking of heavy oil has a distribution of pores in which an entire pore volume of pores defined as pores having a diameter of 5 to 1000 nm is 0.40 dm$^3$/kg or greater, and a volume of intermediate mesopores having a diameter of 10 nm or larger and smaller than 20 nm accounts for 60% or greater of the entire pore volume.

11 Claims, No Drawings

HYDROCRACKING CATALYST FOR HEAVY OIL AND METHOD FOR HYDROTREATING HEAVY OIL USING SAME

CROSS-REFERENCE TO RELATED APPLICATIONS

The application is a National Stage application of PCT/JP2010/063010, filed Aug. 2, 2010, which claims priority from Japanese Application No. JP 2009-180946, filed Aug. 3, 2009.

TECHNICAL FIELD

The present invention relates to a catalyst for hydrocracking of heavy oil and, more specifically, to a catalyst for hydrocracking of heavy oil which has excellent desulfurization activity and excellent conversion (hereinafter, refer to as "conversion") and to a hydroprocessing method for heavy oil using the same catalyst.

BACKGROUND ART

An atmospheric residue (AR) obtained from crude oil is hydrodesulfurized by an apparatus for direct desulfurization of fuel oil (hereinafter, referred to as a "direct desulfurization apparatus"), and distillates such as desulfurized naphtha, desulfurized kerosene, and desulfurized gas oil and desulfurized fuel oil are formed. Desulfurized fuel oil is used as fuel for boilers for power generation and others as low-sulfur fuel oil C. Desulfurized fuel oil is also used as a raw material used in fluid catalytic cracking (FCC) apparatuses, and light fractions such as fluid catalytically cracked gasoline (hereinafter, referred to as "FCC gasoline"), fluid catalytically cracked gas oil (hereinafter, referred to as "LCO: light cycle oil"), and the LPG fraction are produced.

In recent years, crude oil available as a raw material oil in purification of oil is becoming heavier, and crude oil containing heavy oil in great amounts tends to be used more frequently as the raw material oil. Moreover, the demand for heavy oil is decreasing. For example, the demand for fuel oil for power generation and for boilers is decreasing. The demand for the LCO fraction formed with the fluid catalytic cracking apparatus is also decreasing.

In contrast, the demand for gasoline is increasing, and the demand for the LPG fraction and the naphtha fraction used as a raw material for many petrochemical products such as propylene, butene, and BTX including benzene, toluene, and xylene is also increasing. Therefore, development of technology for producing light fractions such as gasoline, the naphtha fraction and the LPG fraction from heavy oil such as the atmospheric residue is an important problem.

Under such circumstances, hydrocracking methods in which desulfurized fuel oil and desulfurized heavy gas oil obtained by hydrocracking treatment of heavy oil with a hydrodesulfurization apparatus such as a direct desulfurization apparatus and an indirect desulfurization apparatus are further decomposed to increase the amount of production of desulfurized naphtha, desulfurized kerosene, and desulfurized gas oil etc. are under development. In addition, research and development of a method for converting the desulfurized fuel oil and desulfurized heavy gas oil into light fractions such as the LPG fraction, the FCC gasoline fraction, and the LCO fraction by catalytic cracking with a great degree of decomposition by a fluid catalytic cracking apparatus are conducted. In the method, a catalyst obtained by supporting an active metal on a support including a crystalline aluminosilicate is usually used as a catalyst for hydrocracking of heavy oil.

However, the use of the catalyst may provide an insufficient desulfurization activity in contrast to a high conversion. Further, the conversion of components having high boiling points such as a vacuum residue (VR) having a boiling point of 525° C. or higher in the heavy oil has not always been sufficient.

In view of the foregoing, research and development have been performed to solve those drawbacks. For example, there are many reports on a catalyst for hydrocracking of heavy hydrocarbon oil as a catalyst obtained by supporting an active metal on a support made up of a mixture of a crystalline aluminosilicate such as a zeolite for imparting conversion and an inorganic oxide such as alumina for imparting desulfurization activity (see, for example, Patent Documents 1 to 3).

Patent Document 1 discloses a catalyst for hydrocracking of heavy oil obtained by supporting an active metal on a support made up of a specific aluminosilicate supporting iron in an amount of 65% by mass and alumina in an amount of 35% by mass, as a catalyst capable of raising the yield of middle distillates, in hydrocracking of heavy oil.

In addition, Patent Document 2 discloses a catalyst for decomposing heavy oil as a catalyst obtained by supporting an active metal on a support including a zeolite in an amount of 2 to 35% by mass and specific alumina having an average pore diameter of 6 to 12.5 nm in an amount of 65 to 98% by mass.

In addition, Patent Document 3 discloses that a catalyst obtained by supporting an active metal on a support produced by mixing a slurry of a crystalline aluminosilicate and a slurry of an aluminum compound is effective for a conversion reaction of hydrocarbon. Patent Document 3 describes that for a mixing ratio of the slurry of a crystalline aluminosilicate and the slurry of an aluminum compound, the former is 65% by mass, and the percentage of mesopores in the distribution of pores is 49% or smaller.

However, in the above-mentioned catalysts for hydrocracking including a support made up of a crystalline aluminosilicate, alumina, and the like, as described in Patent Documents 1 and 3, when the mixing ratio of the crystalline aluminosilicate in the support is increased, conversion is enhanced, but desulfurization activity becomes insufficient, and as described in Patent Document 2, when the mixing ratio of the crystalline aluminosilicate in the support is decreased and the mixing ratio of alumina in the support is increased, desulfurization activity is enhanced, but conversion becomes insufficient. Thus, catalysts for hydrocracking of heavy oil for which high conversion and high desulfurization activity are simultaneously demanded have been in the situation where none of the catalysts can sufficiently meet the above-mentioned demands.

Thus, there has been a demand for a catalyst for hydrocracking of heavy oil simultaneously having higher conversion and higher desulfurization activity.

PRIOR ART DOCUMENTS

[Patent Documents]

| | |
|---|---|
| Patent Document 1 | JP 02-289419 A |
| Patent Document 2 | JP 03-284354 A |
| Patent Document 3 | JP 06-285374 A |

SUMMARY OF THE INVENTION

Problems to be solved by the Invention

Under such circumstances, an object of the present invention is to provide a catalyst for hydrocracking excellent in both functions of conversion and desulfurization activity with respect to heavy oil by striking a balance between the conversion and the desulfurization activity.

Means for Solving the Problems

The inventors of the present invention have found that in a catalyst for hydrocracking including a support made up of a crystalline aluminosilicate and a porous inorganic oxide excluding the crystalline aluminosilicate, the mixing ratio of the crystalline aluminosilicate and the distribution of pores in the catalyst are optimized minutely, resulting in the accomplishment of the object of the present invention. The present invention has been completed based on the above-mentioned finding.

That is, the present invention provides the following:

1. A catalyst for hydrocracking of heavy oil, including a support which includes a crystalline aluminosilicate and a porous inorganic oxide excluding the crystalline aluminosilicate, with an active metal being supported on the support, in which (a) the support includes the crystalline aluminosilicate in an amount of 45% by mass or greater and smaller than 60% by mass and the porous inorganic oxide excluding the crystalline aluminosilicate in an amount of greater than 40% by mass and 55% by mass or smaller, based on the sum of an amount of the crystalline aluminosilicate and an amount of the porous inorganic oxide excluding the crystalline aluminosilicate, (b) the active metal is at least one kind of metal selected from metals belonging to Groups 6, 8, 9, and 10 of the Periodic Table, and (c) the catalyst for hydrocracking of heavy oil has a distribution of pores in which an entire pore volume of pores defined as pores having a diameter of 5 to 1000 nm is 0.40 $dm^3/kg$ or greater, and a volume of intermediate mesopores having a diameter of 10 nm or larger and smaller than 20 nm accounts for 60% or greater of the entire pore volume;

2. The catalyst for hydrocracking of heavy oil according to the item 1 described above, in which the catalyst for hydrocracking of heavy oil includes enlarged mesopores having a diameter of 20 to 50 nm, whose volume accounts for 10% or greater and 20% or smaller of the entire pore volume;

3. The catalyst for hydrocracking of heavy oil according to the item 1 or 2 described above, in which the catalyst for hydrocracking of heavy oil includes intermediate mesopores having a diameter of 10 nm or larger and smaller than 20 nm, whose volume accounts for greater than 65% and 75% or smaller of a mesopore volume (pore volume of pores defined as pores having a diameter of 5 to 50 nm);

4. The catalyst for hydrocracking of heavy oil according to any one of the items 1 to 3 described above, in which the mesopore volume accounts for 85 to 90% of the entire pore volume;

5. The catalyst for hydrocracking of heavy oil according to any one of the items 1 to 4 described above, in which the support used for the catalyst for hydrocracking of heavy oil has an average pore diameter of 14 nm or greater and the mesopores show a maximum value of 13 to 15 nm;

6. The catalyst for hydrocracking of heavy oil according to any one of the items 1 to 5 described above, in which the crystalline aluminosilicate is one of an ultrastable Y-type zeolite and an ultrastable Y-type zeolite supporting a metal;

7. The catalyst for hydrocracking of heavy oil according to any one of the items 1 to 6 described above, in which the porous inorganic oxide excluding the crystalline aluminosilicate includes, as a main component, alumina which is produced via a process in which an alumina hydrate (boehmite gel) is obtained as an intermediate through a neutralization reaction of an aqueous solution containing an aluminum salt, the alumina hydrate showing a relative peak high of boehmite crystals of 65 to 85 which is a value obtained by X-ray diffraction analysis (XRD); and 8. A hydroprocessing method for heavy oil, in which the catalyst for hydrocracking of heavy oil according to any one of the items 1 to 6 described above is used.

Effect of the Invention

The present invention can provide the catalyst for hydrocracking excellent in both functions of the conversion and desulfurization activity with respect to heavy oil by striking a balance between the conversion and the desulfurization activity.

BEST MODE FOR CARRYING OUT THE INVENTION

The present invention is a catalyst for hydrocracking of heavy oil, the catalyst including an active metal supported on a support including crystalline aluminosilicate and a porous inorganic oxide excluding the crystalline aluminosilicate (may be simply referred to as a "porous inorganic oxide").

[Crystalline Aluminosilicate]

Various aluminosilicates can be used as the crystalline aluminosilicate. Preferred examples of the crystalline aluminosilicate include a hydrogen-form faujasite, an ultrastable Y-type zeolite (hereinafter, may be referred to as an "USY zeolite"), and an USY zeolite supporting a metal. Of those, the USY zeolite and the USY zeolite supporting a metal are preferred, and the USY zeolite supporting a metal is particularly preferred.

As the USY zeolite supporting a metal, USY zeolites supporting a metal which are USY zeolites supporting one kind or two more kinds of metals selected from metals of Groups 3 to 16 of the Periodic Table are preferred, and USY zeolites supporting iron which support iron as the metal are particularly preferred.

The USY zeolite and the USY zeolite supporting a metal described above can be produced, for example, in accordance with the method described in the following.

As the raw material for the USY zeolite, a Y-type zeolite containing silica and alumina in amounts such that the ratio (molar ratio) of silica to alumina, i.e., $SiO_2/Al_2O_3$, is 4.5 or greater and preferably 5.0 or greater and $Na_2O$ in an amount of 2.4% by mass or smaller and preferably 1.8% by mass or smaller is used.

As the first step, the Y-type zeolite described above is treated by steaming to form an USY zeolite. The condition for the steaming treatment can be suitably selected in accordance with various circumstances. It is preferred that the treatment be conducted in the presence of steam at a temperature of 510 to 810° C. Steam may be introduced from the outside, or physisorbed water or crystal water contained in the Y-type zeolite may be used. In addition, an acid is added to the USY zeolite obtained by the steaming treatment, and the resultant mixture is treated by mixing under stirring so that aluminum may be removed from the crystalline structure of the zeolite and the removed aluminum may be cleaned and removed from the zeolite by steaming and treatment with an acid.

As the acid, various kinds of acids can be used. In general, hydrochloric acid, nitric acid, and sulfuric acid are used. Further, inorganic acids such as phosphoric acid, perchloric acid, peroxodisulfonic acid, dithionic acid, sulfamic acid, and nitrososulfonic acid and organic acids such as formic acid, trichloroacetic acid, and trifluoroacetic acid can be used. The amount of the acid to be added is 0.5 to 20 moles and preferably 3 to 16 moles per kg of the USY zeolite. The concentration of the solution of the acid is 0.5 to 50% by mass and preferably 1 to 20% by mass. The treatment temperature is in the range of room temperature to 100° C. and preferably 50 to 100° C. The treatment time is 0.1 to 12 hours.

Then, a solution of a metal salt is added to the system so that the metal may be supported on the USY zeolite. As a method of supporting a metal, there are exemplified a treatment of mixing under stirring, a dipping method, and an impregnation method. The treatment of mixing under stirring is preferred. Examples of the metal include: yttrium and lanthanum of Group 3; zirconium and titanium of Group 4; vanadium, niobium, and tantalum of Group 5; chromium, molybdenum, and tungsten of Group 6; manganese and rhenium of Group 7; iron, ruthenium, and osmium of Group 8; cobalt, rhodium, and iridium of Group 9; nickel, palladium, and platinum of Group 10; copper of Group 11; zinc and cadmium of Group 12; aluminum and gallium of Group 13; tin of Group 14; phosphorus and antimony of Group 15; and selenium of Group 16 of the Periodic Table. Of those, titanium, iron, manganese, cobalt, nickel, palladium, and platinum are preferred, and iron is particularly preferred.

As various metal salts, sulfates and nitrates are preferred. When treatment with a solution of the metal salt is conducted, in general, the treatment temperature is 30 to 100° C. and preferably 50 to 80° C., and the treatment time is 0.1 to 12 hours and preferably 0.5 to 5 hours although the conditions vary depending on the circumstances and cannot be decided independently of the circumstances. It is preferred that the metal be supported on the support simultaneously when aluminum is removed from the crystalline structure of the zeolite. The treatment is conducted at a pH suitably selected in the range of 2.0 or smaller and preferably 1.5 or smaller. Examples of the kind of the salt of iron include ferrous sulfate and ferric sulfate, and ferric sulfate is preferred. It is preferred that the sulfate of iron be added as a solution although the sulfate of iron may be added without being dissolved into a solvent. For a solvent dissolving the salt of iron, any solvent which can dissolve the salt of iron can be used. Water, alcohols, ethers, ketones, and the like are preferred as the solvent. In addition, the concentration of the sulfate of iron to be added is generally 0.02 to 10.0 moles/liter and preferably 0.05 to 5.0 moles/liter.

Note that, when the zeolite is treated by adding the acid and the sulfate of iron, it is preferred that the slurry ratio, i.e., the volume (liter) of the treatment solution/the weight (kg) of the zeolite, is in the range of preferably 1 to 50 and particularly preferably in the range of 5 to 30.

The zeolite supporting iron obtained by the treatment described above is further washed with water and dried as necessary.

The USY zeolite and the USY zeolite supporting a metal can be produced as described above.

[Porous Inorganic Oxide Excluding Crystalline Aluminosilicate]

On the other hand, there are exemplified, as porous inorganic oxides constituting a support as a mixture with the crystalline aluminosilicate, alumina, silica-alumina, silica, alumina-boria, alumina-zirconia, alumina-titania, and the like. It is preferred that alumina be used as a main component in the present invention. Here, the main component refers to a component which is included at a ratio of 50% by mass or greater, preferably 70% by mass or greater, or more preferably 80% by mass or greater, based on the total amount of the porous inorganic oxides (100% by mass). Here, a boehmite gel, an alumina sol, or alumina produced therefrom is preferably used as alumina. Alumina is suitable from the viewpoint that an active metal can be highly dispersed and supported thereon. In particular, the alumina described below is preferred from the viewpoint of enabling easy optimization of the distribution of pores in a catalyst.

Particularly preferred alumina is one that is produced via a process in which an alumina hydrate (boehmite gel) is obtained as an intermediate through a neutralization reaction of an aqueous solution containing an aluminum salt, the alumina hydrate showing a relative peak high of boehmite crystals of 65 to 85 which is a value obtained by X-ray diffraction analysis (XRD). When the relative peak high is 65 or greater, the average pore diameter of alumina is not excessively small, and hence the desulfurization activity of a catalyst with respect to heavy oil may not decline. When the relative peak high is 85 or smaller, the average pore diameter of alumina is not excessively large, and hence the conversion of the catalyst may not decline.

Note that the relative peak high of boehmite crystals of the alumina hydrate in the present invention is obtained by measuring each of the peak highs (height of a peak) of alumina (boehmite) in a standard substance and a sample substance at 2θ: 10° to 20° by using an X-ray diffractometer and performing calculation with the obtained values based on the equation (1) described below. To be specific, relative peak highs are values obtained by measurement by the methods described in examples, followed by calculation.

A suitable method of producing alumina satisfying the conditions described above is exemplified below.

The production method involves performing:
(1) the step of obtaining an alumina hydrate (boehmite) having a pH of 6 to 11 by carrying out a reaction between an aqueous solution containing an aluminum salt and a neutralizer; and then
(2) the steps of washing, aging, drying, and kneading the resultant alumina hydrate.

In the above-mentioned method, in general, aluminum sulfate, aluminum nitrate, aluminum chloride, or the like is used as an aluminum salt, and sodium aluminate, potassium aluminate, sodium hydroxide, ammonia, or the like is used as a neutralizer.

In addition, the pH of the alumina hydrate is more preferably weakly alkaline with a pH of 7 to 10 from the viewpoint that a hydrate having a preferred particle diameter is easily obtained.

In the washing step of (2), sufficient washing is preferably performed. When aluminum sulfate is used as the aluminum salt, for example, washing is preferably performed so that the residual amount of sulfate ($SO_4^{2-}$) in the alumina hydrate may become 1% by mass or smaller, and washing is more preferably performed so that the residual amount may become 0.7% by mass or smaller. Further, the temperature during the aging step is 80 to 160° C., or preferably 90 to 100° C. The kneading time is 1 to 24 hours, or preferably 2 to 12 hours.

Note that the above-mentioned method of producing alumina is preferably the method described in JP 3755826 B2.

[Production Method of Support in Catalyst for Hydrocracking]

As the support in the catalyst for hydrocracking of heavy oil of the present invention, a mixture of the crystalline aluminosilicate such as the USY zeolite and the USY zeolite supporting a metal described above, and a porous inorganic oxide excluding the crystalline aluminosilicate is used. When the ratio of the crystalline aluminosilicate is excessively small in the mixture of the crystalline aluminosilicate and the porous inorganic oxide, a high reaction temperature is required for the reaction to obtain the desired degree of conversion, light fractions, and middle distillates, with the result that the life of the catalyst is adversely affected. In addition, when the ratio of the crystalline aluminosilicate is excessively great, the conversion of heavier vacuum residues (hereinafter, referred to as VR (525+° C.) fraction) is decreased, and the decomposition selectivity for the light fractions and the middle distillates is decreased although the conversion of the atmospheric residue (hereinafter, referred to as AR (343+° C.) fraction) is increased.

Meanwhile, the porous inorganic oxide such as alumina disperses the supported active metal to a great extent. When the ratio of the porous inorganic oxide is excessively great (that is, when the amount of the crystalline aluminosilicate is smaller than 45% by mass and the amount of the porous inorganic oxide exceeds 55% by mass), the desired degree of conversion cannot be obtained and it becomes difficult to obtain the light fractions and the middle distillates since the ratio of the crystalline aluminosilicate is decreased, although the hydrogenation activity is great and at least one of the desulfurization activity, the denitrogenation activity, the carbon residue removal activity, the asphaltene removal activity, and the metal removal activity is increased. In addition, when the ratio of the porous inorganic oxide is small (that is, when the amount of the crystalline aluminosilicate is 60% by mass or greater and the amount of the porous inorganic oxide is 40% by mass or smaller), a problem arises that at least one of the desulfurization activity, the denitrogenation activity, the carbon residue removal activity, the asphaltene removal activity, and the metal removal activity (so-called hydrogenation activity) is decreased.

Therefore, as for a mixing ratio of the crystalline aluminosilicate and the porous inorganic oxide, it is required that the amount of the crystalline aluminosilicate is between 45% by mass or greater and smaller than 60% by mass, and the amount of the porous inorganic oxide exceeds 40% by mass and is 55% by mass or smaller based on the sum of the amount of the crystalline aluminosilicate and the amount of the porous inorganic aluminosilicate. It is more preferred that the amount of the crystalline aluminosilicate is between 47% by mass or greater and 55% by mass or smaller, and the amount of the porous inorganic oxide is between 45% by mass or greater and 53% by mass or smaller.

It is preferred that the support in the catalyst for hydrocracking of heavy oil of the present invention is made up of the crystalline aluminosilicate and the porous inorganic oxide described above alone. However, where necessary, a third component such as a clay mineral and phosphorus may be mixed into the support. When the third component is mixed, the amount of the third component is preferably 1 to 30% by mass and particularly preferably 3 to 25% by mass based on the sum of the amount of the crystalline aluminosilicate, the amount of the porous inorganic oxide, and the amount of the third component, which is set at 100% by mass. When the amount of the third component exceeds 30% by mass, the surface area of the support is decreased, and the activity of the catalyst may not be sufficiently exhibited. When the amount of the third component is smaller than 1% by mass, the effect expected by the addition of the third component may not be exhibited.

For producing the support in the catalyst for hydrocracking of heavy oil of the present invention, it is preferred that the crystalline aluminosilicate such as the USY zeolite and the USY zeolite supporting a metal described above is used in the state of a slurry containing water after the washing with water. Next, the crystalline aluminosilicate and the porous inorganic oxide are sufficiently mixed with each other in the presence of a sufficient amount of water using a kneader.

The porous inorganic oxide is in the form of a gel or a sol. The porous inorganic oxide is formed into a slurry by adding water similarly to the crystalline aluminosilicate and mixed with the crystalline aluminosilicate. The content of water in the slurry of the crystalline aluminosilicate is 30 to 80% by mass and more preferably 40 to 70% by mass, and the content of water in the slurry of the porous inorganic oxide is 50 to 90% by mass and more preferably 55 to 85% by mass.

After the crystalline aluminosilicate and the porous inorganic oxide are mixed by kneading, the mixture is formed into molded products having a diameter of 1/12 to 1/32 inch and a length of 1.5 to 6 mm in a cylinder shape, a three-leaf shape, or a four-leaf shape. The molded products are dried at 30 to 200° C. for 0.1 to 24 hours and then calcined at 300 to 750° C. (preferably at 450 to 700° C.) for 1 to 10 hours (preferably 2 to 7 hours) to obtain a support.

[Production of Catalyst for Hydrocracking]

As for the catalyst for hydrocracking of the present invention, as an active metal for hydrogenation, at least one kind of metal selected from metals of Groups 6, 8, 9, and 10 of the Periodic Table is supported on the support described above. As the metal belonging to Group 6 of the Periodic Table, molybdenum and tungsten are preferred. As the metal belonging to Groups 8 to 10, nickel and cobalt are preferred. Examples of the combination of two kinds of metals include combinations of nickel-molybdenum, cobalt-molybdenum, nickel-tungsten, and cobalt-tungsten. Of those, the combinations of cobalt-molybdenum and nickel-molybdenum are preferred, and the combination of nickel-molybdenum is particularly preferred.

The amount with which the metal as the active ingredient is supported on the support is not particularly limited and may be suitably selected in accordance with various conditions such as the type of the raw material oil and the desired yield of the naphtha fraction. In general, the amount of the metal of Group 6 is 0.5 to 30% by mass and preferably 5 to 20% by mass of the amount of the entire catalyst, and the amount of the metal of Groups 8 to 10 is 0.1 to 20% by mass and preferably 1 to 10% by mass of the amount of the entire catalyst.

The method for supporting the metal component on the support is not particularly limited, and a conventional method such as the impregnation method, the kneading method, and the coprecipitation method can be used.

A product obtained by supporting the metal component on the support is dried, in general, at 30 to 200° C. for 0.1 to 24 hours and then calcined at 250 to 700° C. (preferably at 300 to 650° C.) for 1 to 10 hours (preferably 2 to 7 hours) to obtain a catalyst.

[Distribution of Pores in Catalyst for Hydrocracking]

The catalyst for hydrocracking of heavy oil of the present invention is required to have the distributions of pores shown in the items (1) and (2) described below.

(1) Entire Pore Volume

The entire pore volume of pores in the catalyst, defined as pores having a diameter of 5 to 1000 nm, is required to be 0.40 $dm^3/kg$ or greater, is preferably 0.42 $dm^3/kg$ or greater, or is more preferably 0.43 $dm^3/kg$ or greater. When the entire pore volume is 0.40 $dm^3/kg$ or greater, the degree of diffusion of molecules of heavy oil such as vacuum residue can be enhanced. The upper limit of the entire pore volume is not particularly restricted, but the entire pore volume is usually 1.0 $dm^3/kg$ or smaller.

Note that the entire pore volume of pores having a diameter of 5 nm or larger in the catalyst of the present invention was measured by the method of mercury injection in accordance with ASTM D4284-03. The entire pore volume in the catalyst of the present invention was measured by setting the contact angle of mercury to 140° and the surface tension of mercury to 480 dyne/cm.

The same method as that described above was used to measure each of the pore volumes and each of the average pore diameters described in the following items (2) to (5).

(2) Volume of Intermediate Mesopores

The pore volume of intermediate mesopores (intermediate mesopore volume) in the catalyst, defined as pores having a diameter of 10 nm or larger and smaller than 20 nm, is required to account for 60% or greater of the entire pore volume. The case where the intermediate mesopore volume is smaller than 60% is not preferred because the denitrogenation activity may decline.

The intermediate mesopore volume preferably accounts for larger than 65% and 75% or smaller of a mesopore volume. The mesopore volume is defined as the pore volume of pores having a diameter of 5 to 50 nm. The distribution of pores described above leads to enhancement of conversion to an atmospheric residue and conversion to a vacuum residue and can lead to an increase in the yield of desired middle distillates. At the same time, the distribution of pores described above can lead to enhancement of the performance of removing at least one kind selected from nitrogen, sulfur, a metal, asphaltene, and a carbon residue.

(3) Macropore Volume

The pore volume of macropores (macropore volume) in the catalyst, defined as pores having a diameter of larger than 50 nm and 1000 nm or smaller, preferably accounts for 10% or greater of the entire pore volume. When the macropore volume accounts for smaller than 10% of the entire pore volume, the conversion to a vacuum residue may decline.

The catalyst of the present invention used for hydrocracking preferably further satisfies the following requirements.

(4) Enlarged Mesopore Volume

The pore volume of enlarged mesopores (enlarged mesopore volume) in the catalyst, defined as pores having a diameter of 20 to 50 nm, preferably accounts for 10% or greater and 20% or smaller of the entire pore volume. When the enlarged mesopore volume is within the range, denitrogenation activity and carbon residue removal activity can be maintained at a high level.

(5) Mesopore Volume

The pore volume of mesopores (mesopore volume) in the catalyst, defined as pores having a diameter of 5 to 50 nm, preferably accounts for 85 to 90% of the entire pore volume. When the mesopore volume is within the range, the desulfurization activity, the denitrogenation activity, and the carbon residue removal activity are not likely to decline.

(6) Average Pore Diameter and Maximum Value of Mesopores

In addition, the average pore diameter of supports used for the catalyst for hydrocracking of the present invention is preferably 14 nm or larger, or more preferably 14.5 to 15.5 nm. Further, the maximum value of mesopores having a diameter of 5 to 50 nm in the supports is preferably in the range of 13 nm to 15 nm. The case where the average pore diameter of the supports and the maximum value of mesopores in the supports satisfy the above-mentioned ranges is preferred from the viewpoint that the performance of desulfurizing a sulfur compound having a large molecular weight is good and catalyst activity can be maintained at a high level.

The catalyst for hydrocracking of heavy oil of the present invention exhibits an increased hydrogenation activity of heavy fractions. The conversion of the fraction having a boiling point of 525° C. or higher (the VR fraction) is great, and the conversion of the fraction having a boiling point of 343° C. or higher (the AR fraction) is also relatively great. Moreover, the catalyst exhibits a great carbon residue removal activity, desulfurization activity, and denitrogenation activity. Therefore, when the hydrocracking is conducted using this catalyst, the properties of the obtained desulfurized heavy oil (DSAR, i.e., desulfurized atmospheric residue, and DSVGO, i.e., desulfurized vacuum gas oil) are advantageous as a raw material used in a fluid catalytic cracking apparatus and the like.

The catalyst for hydrocracking treatment in the present invention is used for the hydrocracking reaction. Hydrodesulfurization reaction, hydrodenitrogenation reaction, and hydrodemetalation reaction are conducted simultaneously with the hydrocracking reaction. These reactions are conducted under the condition of a high pressure of hydrogen. As an apparatus for conducting the hydrocracking reaction under such high pressure, in general, a direct desulfurization apparatus is used.

The condition in the hydrocracking using the catalyst for hydrocracking of heavy oil of the present invention is not particularly limited, and the conventional reaction condition for hydrocracking and hydrodesulfurization reaction of heavy oil is sufficient. The reaction temperature may be selected preferably in the range of 320 to 550° C. and more preferably in the range of 350 to 430° C., the partial pressure of hydrogen may be selected preferably in the range of 1 to 30 MPa and more preferably in the range of 5 to 17 MPa, the ratio of the amounts of hydrogen to oil may be selected preferably in the range of 100 to 2000 $Nm^3$/kiloliter and more preferably in the range of 300 to 1000 $Nm^3$/kiloliter, and the liquid hour space velocity (LHSV) may be selected preferably in the range of 0.1 to 5 $h^{-1}$ and more preferably in the range of 0.2 to 2.0 $h^{-1}$.

Heavy oil such as the vacuum residue, coker oil, synthetic crude oil, topped crude oil, heavy gas oil, vacuum gas oil, LCO, heavy cycle oil (HCO), clarified oil (CLO), gas-to-liquids oil (GTL oil) and wax may be treated by the hydrocracking as a mixture with the atmospheric residue.

The catalyst for hydrocracking of heavy oil of the present invention may be used singly or in combination with conventional hydroprocessing catalysts. As the pattern of the combination, for example, it is preferred that 10 to 40% by volume of a demetalation catalyst is loaded into the first stage, 0 to 50% by volume of a desulfurization catalyst is loaded into the second stage, 10 to 70% by volume of the catalyst for hydrocracking of heavy oil of the present invention is loaded into the third stage, and 0 to 40% by volume of a desulfurization catalyst for finishing is loaded into the fourth stage, each based on the amount of the entire loaded catalysts. The pattern of the loading may be changed in various ways in accordance with the properties of the untreated heavy oil. A guard bed catalyst to protect the main bed catalysts for fouling and poisoning such as iron powder and inorganic oxides contained in the raw material oil may be loaded into a stage before the demetalation catalyst of the first stage.

The catalyst for hydrocracking of heavy oil of the present invention can be utilized, for example, as described in the following.

Using the catalyst for hydrocracking of heavy oil of the present invention, an atmospheric residue is treated by hydrocracking, and the fluid catalytic cracking treatment is conducted using the residue of the obtained oil or a mixture of the residue with a distillate as the raw material oil.

In this case, as the distillate, a distillate having a boiling point of 120 to 400° C. is preferred, and a distillate having a boiling point of 150 to 350° C. is more preferred. When the distillate has the boiling point in such range, converted products having the boiling point in the advantageous range can be obtained, and the effect of increasing the amount of the FCC gasoline is achieved. Further, the mixing ratio of the distillate in the raw material for the fluid catalytic cracking treatment is preferably 1 to 30% by volume and more preferably 3 to 20% by volume. When the amount is in such range, the effect of excellently increasing the LPG fraction and the FCC gasoline fraction can be exhibited.

Note that the condition of the catalytic cracking treatment is not particularly limited, and the catalytic cracking treatment may be conducted in accordance with a conventional method under a conventional condition. For example, using an amorphous catalyst such as silica-alumina and silica-magnesia or a zeolite catalyst such as a faujasite-type crystalline aluminosilicate, the condition may be suitably selected in the following ranges: a reaction temperature in the range of 450 to 650° C. and preferably in the range of 480 to 580° C., a regeneration temperature in the range of 550 to 760° C., and a reaction pressure in the range of 0.02 to 5 MPa and preferably in the range of 0.2 to 2 MPa.

In the treatment for decomposition of the atmospheric residue, the amounts of products obtained by fluid catalytic cracking as the final stage can be adjusted so that the ratio of the FCC gasoline fraction and the LPG fraction useful as a fuel and a raw material for petrochemical products be increased, and the ratio of the LCO fraction having limited demand be decreased.

Moreover, the yield of the kerosene and gas oil fraction which is so-called middle distillates and the naphtha fraction which is the light fraction in products formed by hydrocracking with a direct desulfurization apparatus as the intermediate stage are increased and can be utilized as a fuel and a raw material for petrochemical products.

EXAMPLE

Next, the present invention is described more specifically based on examples, but is not limited to those examples. Note that physical properties of catalysts and the like used in examples and comparative examples were measured by the following methods.

(1) Total Pore Volume

The total pore volume was calculated based on the adsorption-desorption isotherm of nitrogen in accordance with ASTM D4222-03 and D4641-94 ($N_2$ adsorption method). Here, the total pore volume was determined by converting the amount of adsorbed nitrogen at $P/P_0=0.99$ in the adsorption isotherm of nitrogen into the volume.

Measurement was conducted after preliminary treatment was carried out to sufficiently remove contained water by heating at 400° C. for 3 hours under a vacuum while gases were discharged to the outside.

(2) Specific Surface Area

The specific surface area was measured and analyzed in accordance with the BET method of nitrogen adsorption (ASTM D4365-95). The range of $P/P_0$ obtained by calculating the specific surface area from a BET plot was calculated by interpolating five points between 0.01 and 0.10 with straight lines.

Note that measurement was conducted after preliminary treatment was carried out to sufficiently remove contained water by heating at 400° C. for 3 hours under a vacuum while gases were discharged to the outside.

(3) Average Pore Diameter and Maximum Value of Mesopores

The average pore diameter of the supports and the maximum value of mesopores in the supports were determined by analyzing the values obtained by measuring pores by the method of mercury intrusion porosimetry in accordance with ASTM D4284-03.

The average pore diameter of the supports and the maximum value of mesopores in the supports of the present invention were determined by setting the contact angle of mercury to 150° and the surface tension of mercury to 480 dyne/cm. The average pore diameter (APD (nm)) is calculated from the total pore volume (PV ($dm^3/kg$)) and the total surface area (SA ($m^2/g$)) both obtained by the measurements based on the equation $APD=4 \times PV/SA \times 10^3$. Meanwhile, the maximum value of mesopores was defined as the maximum value of pore diameters (nm) of pores in the distribution of a mesopore (5 to 50 nm) region in the distribution of the pore diameters obtained by the measurement.

(4) Relative Peak High of Boehmite Crystals of Alumina Hydrate

An X-ray diffractometer was used to measure each of the alumina (boehmite) peak highs of a standard substance and a sample substance, and a relative peak high was calculated based on the following equation (1).

$$\text{Relative peak high} = (B/A) \times 100 \tag{1}$$

Note that, in the equation, A represents the measured value of the peak high of the standard substance (trade name: CatapalD, manufactured by Sasol Japan K.K.), and B represents the measured value of the peak high of the sample substance.

Note that the measurement conditions of X-ray diffraction are as below.

Measuring apparatus: Rigaku Corporation (RINT-2100)
Measurement conditions:
  Target: Cu
  Filter: Ni
  Voltage: 30 kV
  Current: 14 mA
  Scan Speed: 1°/min
  Full scale: 1000 cps
  Number of smoothing points: 19
  Scan angle (2θ): 10° to 20°
Method of measuring peak high:
  Tangent lines were drawn to backgrounds on both sides of a peak in a broken line profile, and a perpendicular line was then drawn from the top of the peak to calculate the value of height from each background to the top of the peak. The resultant values were defined as the peak highs of respective substances.

(5) Entire Pore Volume, Intermediate Mesopore Volume, Enlarged Mesopore Volume, Macropore Volume, and Average Pore Diameter They were measured by the methods described in the description.

Example 1

Catalyst I for Hydrocracking of Heavy Oil (1) Preparation of Alumina Hydrate 44 kg of pure water were loaded into a 200 little tank made of stainless steel. 2.12 kg of an aqueous solution of sodium aluminate containing 22.0% by mass alumina were added into the tank, followed by heating to 60° C. The temperature of the resultant aqueous solution was kept at 60±3° C. while the aqueous solution was stirred at high speed (about 40 rpm), and 52.3 g of a 26.8% by mass aqueous solution of sodium gluconate were added. Then, 7.2 kg of a 60° C. aqueous solution of aluminum sulfate containing 3.0% by mass alumina were added over about 10 minutes, thereby yielding an alumina seed slurry having a pH of 7.2.

53.4 kg of the alumina seed slurry (containing 0.68 kg of alumina) were loaded into an alumina production apparatus illustrated in FIG. 2 in JP 3755826 B2, followed by stirring. While the temperature of the alumina seed slurry was kept at 60° C., the alumina seed slurry was circulated at a flow rate of 2.0 m$^3$/hr. While the alumina seed slurry was being stirred and circulated, an aqueous solution of sodium aluminate containing 0.18% by mass sodium gluconate (containing 6.0% by mass alumina) and aluminum sulfate containing 3.0% by mass alumina were added over 3 hours so that the temperature and pH of the solution in the tank in the alumina production apparatus was kept at 60±3° C. and at 7.1±0.1, respectively, by controlling the addition rates of the respective solutions, thereby yielding a circulating slurry. The addition amount of the aqueous solution of sodium aluminate containing 6.0% by mass alumina to which sodium gluconate had been added was 70.0 kg, and the addition amount of the aluminum sulfate containing 3.0% by mass alumina was 72.7 kg.

Next, 17.0 kg of an aqueous solution of sodium aluminate containing 6.0% by mass alumina were added so that the circulating slurry might have a pH of 9.9. After that, the circulating slurry was washed so as to remove sodium and sulfate, thereby preparing a prepared slurry.

In the resultant prepared slurry, sodium was contained at 0.05% by mass as $Na_2O$ and sulfate was contained at 0.2% by mass as $SO_4^{2-}$.

Next, deionized water was added to the prepared slurry so that an $Al_2O_3$ concentration might reach 15% by mass. 15% by mass ammonia water was further added so that the pH of the resultant solution was adjusted to 10.5. After that, an aging tank equipped with a refluxer was used to subject the resultant solution to aging at 95° C. for 4.5 hours to yield an aged slurry. After completion of the aging, the aged slurry was subjected to evaporation condensation, followed by kneading for 0.5 hour, by using a double-arm kneader with a steam jacket, thereby yielding an alumina hydrate.

The above-mentioned alumina hydrate was measured for a relative peak high of boehmite crystals by the following method. The result was 73.

(2) Preparation of Crystalline Aluminosilicate

A synthesized NaY-type zeolite (the content of $Na_2O$ is 13.5% by mass, $SiO_2/Al_2O_3$ in molar ratio is 5.2, and the crystalline lattice constant is 2.466 nm) was subjected to ammonium ion exchange and then subjected to steaming treatment at 650° C., thereby yielding a USY-type zeolite (the content of $Na_2O$ is 1.0% by mass or smaller and the crystalline lattice constant is 2.435 nm).

Next, after 10 kg of the USY-type zeolite were suspended in 115 liter of pure water, the temperature of the resultant suspension was raised to 75° C. and the suspension was stirred for 30 minutes. To the suspension, 13.7 kg of a 10% by mass solution of sulfuric acid were then added over 35 minutes, and 11.5 kg of a solution of ferric sulfate having a concentration of 0.57 mole/liter were further added over 10 minutes. After that, the resultant mixture was stirred for 30 minutes, filtered, and washed, thereby yielding a slurry of an iron-supporting crystalline aluminosilicate having a solid concentration of 30% by mass. The iron-supporting crystalline aluminosilicate was subjected to an X-ray diffraction method. As a result, the lattice constant of the crystalline aluminosilicate was 2.432 nm.

(3) Preparation of Catalyst for Hydrocracking of Heavy Oil

An alumina hydrate in an amount equivalent to 1.50 kg as a dry weight and a slurry of an iron-supporting crystalline aluminosilicate in an amount equivalent to 1.50 kg as a dry weight were loaded into a kneader, and the mixture was condensed so as to have a concentration enough for undergoing extrusion molding while being heated and stirred. After that, the mixture was subjected to extrusion molding, thereby yielding a pellet-like product having a four-leaf shape with a $\frac{1}{18}$ inch size.

The resultant molded product was dried at 110° C. for 16 hours, and then calcined at 550° C. for 3 hours, thereby yielding Catalyst support A including an iron-supporting crystalline aluminosilicate/alumina (mass ratio in terms of solid content) at 50/50.

Next, a suspension obtained by suspending molybdenum trioxide and nickel carbonate in pure water was heated to 90° C., and malic acid was added to and dissolved in the suspension to yield a solution. Catalyst support A was impregnated with the resultant solution so that $MoO_3$ was contained at 10.6% by mass and NiO was contained at 4.2% by mass with respect to the entire catalyst. After that, the resultant product was dried at 250° C. and calcined at 550° C. for 1 hour, thereby yielding Catalyst I for hydrocracking of heavy oil.

Physical properties of Catalyst I for hydrocracking of heavy oil are shown in Table 1.

Example 2

Catalyst II for Hydrocracking of Heavy Oil (1) Preparation of Alumina Hydrate

The same alumina seed slurry as that in Example 1 was loaded in an amount of 53.4 kg (containing 0.68 kg of alumina) into an alumina production apparatus, followed by stirring. While the temperature of the alumina seed slurry was kept at 60° C., the alumina seed slurry was circulated at a flow rate of 2.0 m$^3$/hr. While the alumina seed slurry was being stirred and circulated, an aqueous solution of sodium aluminate containing 0.18% by mass sodium gluconate (containing 6.0% by mass alumina) and aluminum sulfate containing 3.0% by mass alumina were added over 3 hours so that the temperature and pH of the solution in the tank of the alumina production apparatus was kept at 60±3° C. and at 7.2±0.1, respectively, by controlling the addition rates of the respective solutions, thereby yielding a circulating slurry. The addition amount of the aqueous solution of sodium aluminate containing 6.0% by mass alumina to which sodium gluconate had been added was 70.0 kg, and the addition amount of the aluminum sulfate containing 3.0% by mass alumina was 70.8 kg.

Next, 11.9 kg of an aqueous solution of sodium aluminate containing 6.0% by mass alumina were added so that the circulating slurry had a pH of 9.8. After that, the circulating slurry was washed so as to remove sodium and sulfate, thereby preparing a prepared slurry. In the resultant prepared slurry, sodium was contained at 0.05% by mass as $Na_2O$ and sulfate was contained at 0.6% by mass as $SO_4^{2-}$.

Next, deionized water was added to the prepared slurry so that an $Al_2O_3$ concentration reached 15% by mass. 15% by mass ammonia water was further added so that the pH of the resultant solution was adjusted to 10.5. After that, an aging tank equipped with a refluxer was used to subject the resultant solution to aging at 95° C. for 8.5 hours to yield an aged slurry. After completion of the aging, the aged slurry was subjected to evaporation condensation, followed by kneading for 0.5 hour, by using a double-arm kneader with a steam jacket, thereby yielding an alumina hydrate. The relative peak high of boehmite crystals of the alumina hydrate was 78.

(2) Preparation of Catalyst for Hydrocracking of Heavy Oil

An alumina hydrate in an amount equivalent to 1.44 kg as a dry weight and a slurry of an iron-supporting crystalline aluminosilicate prepared in the same manner as that in Example 1 in an amount equivalent to 1.56 kg as a dry weight were loaded into a kneader, and the mixture was condensed so as to have a concentration enough for undergoing extrusion molding while being heated and stirred. After that, the mixture was subjected to extrusion molding, thereby yielding a pellet-like product having a four-leaf shape with a ⅛ inch size.

The resultant molded product was dried at 110° C. for 16 hours, and then calcined at 550° C. for 3 hours, thereby yielding Catalyst support B including an iron-supporting crystalline aluminosilicate/alumina (mass ratio in terms of solid content) at 52/48.

Next, a suspension obtained by suspending molybdenum trioxide and nickel carbonate in pure water was heated to 90° C., and malic acid was added to and dissolved in the suspension to yield a solution. Catalyst support B was impregnated with the resultant solution so that $MoO_3$ was contained at 10.6% by mass and NiO was contained at 4.2% by mass with respect to the entire catalyst. After that, the resultant product was dried at 250° C. and calcined at 550° C. for 1 hour, thereby yielding Catalyst II for hydrocracking of heavy oil.

Physical properties of Catalyst II for hydrocracking of heavy oil are shown in Table 1.

Comparative Example 1

Catalyst III for Hydrocracking of Heavy Oil (1) Preparation of Alumina Hydrate

The same alumina seed slurry as that in Example 1 was loaded in an amount of 53.4 kg (containing 0.68 kg of alumina) into an alumina production apparatus, followed by stirring. While the temperature of the alumina seed slurry was kept at 60° C., the alumina seed slurry was circulated at a flow rate of 2.0 m³/hr. While the alumina seed slurry was being stirred and circulated, an aqueous solution of sodium aluminate containing 0.18% by mass sodium gluconate (containing 6.0% by mass alumina) and aluminum sulfate containing 3.0% by mass alumina were added over 3 hours so that the temperature and pH of the solution in the tank was kept at 60±3° C. and at 7.2±0.1, respectively, by controlling the addition rates of the respective solutions, thereby yielding a circulating slurry. The addition amount of the aqueous solution of sodium aluminate containing 6.0% by mass alumina to which sodium gluconate had been added was 70.0 kg, and the addition amount of the aluminum sulfate containing 3.0% by mass alumina was 70.8 kg.

Next, 9.3 kg of an aqueous solution of sodium aluminate containing 6.0% by mass alumina were added so that the circulating slurry might have a pH of 9.6. After that, the circulating slurry was washed so as to remove sodium and sulfate, thereby preparing a prepared slurry. In the resultant prepared slurry, sodium was contained at 0.05% by mass as $Na_2O$ and sulfate was contained at 1.2% by mass as $SO_4^{2-}$.

Next, deionized water was added to the prepared slurry so that an $Al_2O_3$ concentration might reach 15% by mass. 15% by mass ammonia water was further added so that the pH of the resultant solution was adjusted to 10.5. After that, an aging tank equipped with a refluxer was used to subject the resultant solution to aging at 95° C. for 8.5 hours to yield an aged slurry. After completion of the aging, the aged slurry was subjected to evaporation condensation, followed by kneading for 0.5 hour, by using a double-arm kneader with a steam jacket, thereby yielding an alumina hydrate. The relative peak high of boehmite crystals of the alumina hydrate was 60.

(2) Preparation of Catalyst for Hydrocracking of Heavy Oil

An alumina hydrate in an amount equivalent to 1.20 kg as a dry weight and a slurry of an iron-supporting crystalline aluminosilicate prepared in the same manner as that in Example 1 in an amount equivalent to 1.80 kg as a dry weight were loaded into a kneader, and the mixture was condensed so as to have a concentration enough for undergoing extrusion molding while being heated and stirred. After that, the mixture was subjected to extrusion molding, thereby yielding a pellet-like product having a four-leaf shape with a ⅛ inch size.

The resultant molded product was dried at 110° C. for 16 hours, and then calcined at 550° C. for 3 hours, thereby yielding Catalyst support C including an iron-supporting crystalline aluminosilicate/alumina (mass ratio in terms of solid content) at 60/40.

Next, a suspension obtained by suspending molybdenum trioxide and nickel carbonate in pure water was heated to 90° C., and malic acid was added to and dissolved in the suspension to yield a solution. Catalyst support C was impregnated with the resultant solution so that 14° $O_3$ was contained at 10.6% by mass and NiO was contained at 4.2% by mass with respect to the entire catalyst. After that, the resultant product was dried at 250° C. and calcined at 550° C. for 1 hour, thereby yielding Catalyst III for hydrocracking of heavy oil.

Physical properties of Catalyst III for hydrocracking of heavy oil are shown in Table 1.

Comparative Example 2

Catalyst IV for Hydrocracking of Heavy Oil (1) Preparation of Alumina Hydrate

The same alumina seed slurry as that in Example 1 was loaded in an amount of 53.4 kg (containing 0.68 kg of alumina) into an alumina production apparatus, followed by stirring. While the temperature of the alumina seed slurry was kept at 60° C., the alumina seed slurry was circulated at a flow rate of 2.0 m³/hr. While the alumina seed slurry was being stirred and circulated, an aqueous solution of sodium aluminate containing 0.18% by mass sodium gluconate (containing 6.0% by mass alumina) and aluminum sulfate containing 3.0% by mass alumina were added over 3 hours so that the temperature and pH of the solution circulating in the tank was kept at 60±3° C. and at 7.2±0.1, respectively, by controlling the addition rates of the respective solutions, thereby yielding a circulating slurry. The addition amount of the aqueous solution of sodium aluminate containing 6.0% by mass alumina to which sodium gluconate had been added was 70.0 kg, and the addition amount of the aluminum sulfate containing 3.0% by mass alumina was 70.8 kg.

Next, 9.3 kg of an aqueous solution of sodium aluminate containing 6.0% by mass alumina were added so that the circulating slurry might have a pH of 9.6. After that, the circulating slurry was washed so as to remove sodium and sulfate, thereby preparing a prepared slurry. In the resultant prepared slurry, sodium was contained at 0.05% by mass as $Na_2O$ and sulfate was contained at 1.2% by mass as $SO_4^{2-}$.

Next, deionized water was added to the prepared slurry so that an $Al_2O_3$ concentration might reach 15% by mass. 15% by mass ammonia water was further added so that the pH of the resultant solution was adjusted to 10.5. After that, an aging tank equipped with a refluxer was used to subject the resultant solution to aging at 95° C. for 8.5 hours to yield an aged slurry. After completion of the aging, the aged slurry was subjected to evaporation condensation, followed by kneading for 0.5 hour, by using a double-arm kneader with a steam jacket, thereby yielding an alumina hydrate. The relative peak high of boehmite crystals of the alumina hydrate was 60.

(2) Preparation of Catalyst for Hydrocracking of Heavy Oil

An alumina hydrate in an amount equivalent to 1.50 kg as a dry weight and a slurry of an iron-supporting crystalline aluminosilicate prepared in the same manner as that in Example 1 in an amount equivalent to 1.50 kg as a dry weight were loaded into a kneader, and the mixture was condensed so as to have a concentration enough for undergoing extrusion molding while being heated and stirred. After that, the mixture was subjected to extrusion molding, thereby yielding a pellet-like product having a four-leaf shape with a 1/18 inch size.

The resultant molded product was dried at 110° C. for 16 hours, and then calcined at 550° C. for 3 hours, thereby yielding Catalyst support D including an iron-supporting crystalline aluminosilicate/alumina (mass ratio in terms of solid content) at 50/50.

Next, a suspension obtained by suspending molybdenum trioxide and nickel carbonate in pure water was heated to 90° C., and malic acid was added to and dissolved in the suspension to yield a solution. Catalyst support D was impregnated with the resultant solution so that $MoO_3$ was contained at 10.6% by mass and NiO was contained at 4.2% by mass with respect to the entire catalyst. After that, the resultant product was dried at 250° C. and calcined at 550° C. for 1 hour, thereby yielding Catalyst IV for hydrocracking of heavy oil.

Physical properties of Catalyst IV for hydrocracking of heavy oil are shown in Table 1.

Comparative Example 3

Catalyst V for Hydrocracking of Heavy Oil (1) Preparation of Alumina Hydrate

The same alumina seed slurry as that in Example 1 was loaded in an amount of 53.4 kg (containing 0.68 kg of alumina) into an alumina production apparatus, followed by stirring. While the temperature of the alumina seed slurry was kept at 60° C., the alumina seed slurry was circulated at a flow rate of 2.0 $m^3$/hr. While the alumina seed slurry was being stirred and circulated, an aqueous solution of sodium aluminate containing 0.18% by mass sodium gluconate (containing 6.0% by mass alumina) and aluminum sulfate containing 3.0% by mass alumina were added over 3 hours so that the temperature and pH of the solution of a circulating slurry circulating in the tank was kept at 60±3° C. and at 7.5±0.1, respectively, by controlling the addition rates of the respective solutions, thereby yielding a circulating slurry. The addition amount of the aqueous solution of sodium aluminate containing 6.0% by mass alumina to which sodium gluconate had been added was 70.0 kg, and the addition amount of the aluminum sulfate containing 3.0% by mass alumina was 69.2 kg.

Next, 6.8 kg of an aqueous solution of sodium aluminate containing 6.0% by mass alumina were added so that the circulating slurry might have a pH of 9.6. After that, the circulating slurry was washed so as to remove sodium and sulfate, thereby preparing a prepared slurry. In the resultant prepared slurry, sodium was contained at 0.05% by mass as $Na_2O$ and sulfate was contained at 1.3% by mass as $SO_4^{2-}$.

Next, deionized water was added to the prepared slurry so that an $Al_2O_3$ concentration might reach 15% by mass. 15% by mass ammonia water was further added so that the pH of the resultant solution was adjusted to 10.5. After that, an aging tank equipped with a refluxer was used to subject the resultant solution to aging at 95° C. for 8.5 hours to yield an aged slurry. After completion of the aging, the aged slurry was subjected to evaporation condensation, followed by kneading for 0.5 hour, by using a double-arm kneader with a steam jacket, thereby yielding an alumina hydrate. The relative peak high of boehmite crystals of the alumina hydrate was 50.

(2) Preparation of Catalyst for Hydrocracking of Heavy Oil

An alumina hydrate in an amount equivalent to 1.35 kg as a dry weight and a slurry of an iron-supporting crystalline aluminosilicate prepared in the same manner as that in Example 1 in an amount equivalent to 1.65 kg as a dry weight were loaded into a kneader, and the mixture was condensed so as to have a concentration enough for undergoing extrusion molding while being heated and stirred. After that, the mixture was subjected to extrusion molding, thereby yielding a pellet-like product having a four-leaf shape with a 1/18 inch size.

The resultant molded product was dried at 110° C. for 16 hours, and then calcined at 550° C. for 3 hours, thereby yielding Catalyst support E including an iron-supporting crystalline aluminosilicate/alumina (mass ratio in terms of solid content) at 45/55.

Next, a suspension obtained by suspending molybdenum trioxide and nickel carbonate in pure water was heated to 90° C., and malic acid was added to and dissolved in the suspension to yield a solution. Catalyst support E was impregnated with the resultant solution so that $MoO_3$ was contained at 10.6% by mass and NiO was contained at 4.2% by mass with respect to the entire catalyst. After that, the resultant product was dried at 250° C. and calcined at 550° C. for 1 hour, thereby yielding Catalyst V for hydrocracking of heavy oil.

Physical properties of Catalyst for hydrocracking of heavy oil V are shown in Table 1.

Comparative Example 4

Catalyst VI for Hydrocracking of Heavy Oil (1) Preparation of Alumina Hydrate

The same alumina seed slurry as that in Example 1 was loaded in an amount of 53.4 kg (containing 0.68 kg of alumina) into an alumina production apparatus, followed by stirring. While the temperature of the alumina seed slurry was kept at 60° C., the alumina seed slurry was circulated at a flow rate of 2.0 $m^3$/hr. While the alumina seed slurry was being stirred and circulated, an aqueous solution of sodium aluminate containing 0.18% by mass sodium gluconate (containing 6.0% by mass alumina) and aluminum sulfate containing 3.0% by mass alumina were added over 3 hours so that the temperature and pH of the solution of the slurry circulating in the tank was kept at 60±3° C. and at 7.2±0.1, respectively, by controlling the addition rates of the respective solutions, thereby yielding a circulating slurry. The addition amount of the aqueous solution of sodium aluminate containing 6.0% by mass alumina to which sodium gluconate had been added was 70.0 kg, and the addition amount of the aluminum sulfate containing 3.0% by mass alumina was 71.3 kg.

Next, 13.9 kg of an aqueous solution of sodium aluminate containing 6.0% by mass alumina were added so that the circulating slurry might have a pH of 9.7. After that, the circulating slurry was washed so as to remove sodium and sulfate, thereby preparing a prepared slurry. In the resultant prepared slurry, sodium was contained at 0.05% by mass as $Na_2O$ and sulfate was contained at 0.8% by mass as $SO_4^{2-}$.

Next, deionized water was added to the prepared slurry so that an $Al_2O_3$ concentration might reach 15% by mass. 15% by mass ammonia water was further added so that the pH of the resultant solution was adjusted to 10.5. After that, an aging tank equipped with a refluxer was used to subject the resultant solution to aging at 95° C. for 8.5 hours to yield an aged slurry. After completion of the aging, the aged slurry was subjected to evaporation condensation, followed by kneading for 0.5 hour, by using a double-arm kneader with a steam jacket, thereby yielding an alumina hydrate. The relative peak high of boehmite crystals of the alumina hydrate was 65.

(2) Preparation of Catalyst for Hydrocracking of Heavy Oil

An alumina hydrate in an amount equivalent to 1.20 kg as a dry weight and a slurry of an iron-supporting crystalline aluminosilicate prepared in the same manner as that in Example 1 in an amount equivalent to 1.80 kg as a dry weight were loaded into a kneader, and the mixture was condensed so as to have a concentration enough for undergoing extrusion molding while being heated and stirred. After that, the mixture was subjected to extrusion molding, thereby yielding a pellet-like product having a four-leaf shape with a ⅟₁₆ inch size.

The resultant molded product was dried at 110° C. for 16 hours, and then calcined at 550° C. for 3 hours, thereby yielding Catalyst support F including an iron-supporting crystalline aluminosilicate/alumina (mass ratio in terms of solid content) at 40/60.

Next, a suspension obtained by suspending molybdenum trioxide and nickel carbonate in pure water was heated to 90° C., and malic acid was added to and dissolved in the suspension to yield a solution. Catalyst support F was impregnated with the resultant solution so that $MoO_3$ was contained at 10.6% by mass and NiO was contained at 4.2% by mass with respect to the entire catalyst. After that, the resultant product was dried at 250° C. and calcined at 550° C. for 1 hour, thereby yielding Catalyst VI for hydrocracking of heavy oil.

Physical properties of Catalyst VI for hydrocracking of heavy oil are shown in Table 1.

TABLE 1

| | | | | Example 1 | Example 2 | Comparative Example 1 | Comparative Example 2 | Comparative Example 3 | Comparative Example 4 |
|---|---|---|---|---|---|---|---|---|---|
| | Catalyst for hydrocracking | | | Catalyst for hydrocracking I | Catalyst for hydrocracking II | Catalyst for hydrocracking III | Catalyst for hydrocracking IV | Catalyst for hydrocracking V | Catalyst for hydrocracking VI |
| Constituent of catalyst | Active metal | Kind of metal | | Ni—Mo | Ni—Mo | Ni—Mo | Ni—Mo | Ni—Mo | Ni—Mo |
| | | Content (in terms of oxide, based on total amount of catalyst) % by mass-% by mass | | 4.2-10.5 | 4.2-10.5 | 4.2-10.5 | 4.2-10.5 | 4.2-10.5 | 4.2-10.5 |
| | Iron-supporting crystalline aluminosilicate | Kind | | USY supporting iron (sulfuric acid method) | USY supporting iron (sulfuric acid method) | USY supporting iron (sulfuric acid method) | USY supporting iron (sulfuric acid method) | USY supporting iron (sulfuric acid method) | USY supporting iron (sulfuric acid method) |
| | | Ratio in support | (% by mass) | 50 | 52 | 60 | 50 | 45 | 40 |
| | | Fe content (based on oxide) | (% by mass) | 2.5 | 2.5 | 2.5 | 2.5 | 2.5 | 2.5 |
| | | $SiO_2/Al_2O_3$ | (molar ratio) | 36 | 36 | 36 | 36 | 36 | 36 |
| | | Lattice constant | (nm) | 2.432 | 2.432 | 2.432 | 2.432 | 2.432 | 2.432 |
| | | Crystallinity | (%) | 0.91 | 0.91 | 0.91 | 0.91 | 0.91 | 0.91 |
| | | Specific surface area | (m²/g) | 840 | 840 | 840 | 840 | 840 | 840 |
| | | Total pore volume | (dm³/kg) | 0.54 | 0.54 | 0.54 | 0.54 | 0.54 | 0.54 |
| | Alumina | Ratio in support | (% by mass) | 50 | 48 | 40 | 50 | 55 | 60 |
| | | Relative peak high of boehmite crystals | | 78 | 78 | 60 | 60 | 50 | 65 |
| | | Amount of sulfate after washing of alumina | (% by mass) | 0.5 | 0.6 | 1.2 | 1.2 | 1.3 | 0.8 |
| Physical property of support | [N₂ adsorption method] | Total pore volume | (dm³/kg) | 0.74 | 0.70 | 0.68 | 0.66 | 0.71 | 0.70 |
| | | Specific surface area | (m²/g) | 565 | 545 | 605 | 564 | 532 | 497 |
| | [Mercury porosimeter method] | Average pore diameter | (nm) | 14.8 | 15.2 | 15.9 | 13.3 | 11.5 | 11.8 |
| | | Maximum value of mesopores | (nm) | 13.9 | 13.9 | 12.2 | 12.0 | 10.6 | 11.5 |
| Physical property of catalyst | [N₂ adsorption method] | Total pore volume | (dm³/kg) | 0.60 | 0.57 | 0.56 | 0.58 | 0.59 | 0.58 |
| | | Specific surface area | (m²/g) | 476 | 454 | 517 | 487 | 455 | 424 |
| | [Mercury porosimeter method] | | | | | | | | |
| | | (i) Entire pore volume | 5 to 1000 (nm) (dm³/kg) | 0.468 | 0.436 | 0.469 | 0.434 | 0.433 | 0.440 |
| | | (ii) Mesopore volume | 5 to 50 (nm) (dm³/kg) | 0.407 | 0.383 | 0.297 | 0.346 | 0.394 | 0.431 |
| | | (iii) Intermediate mesopore volume | 10 or greater and smaller than 20 (nm) (dm³/kg) | 0.291 | 0.265 | 0.169 | 0.204 | 0.184 | 0.278 |
| | | (iv) Enlarged mesopore volume | 20 to 50 (nm) (dm³/kg) | 0.074 | 0.053 | 0.038 | 0.038 | 0.039 | 0.041 |
| | | (v) Macropore volume | Greater than 50 and 1000 or smaller (nm) (dm³/kg) | 0.060 | 0.053 | 0.172 | 0.088 | 0.039 | 0.010 |
| | | (iii)/(i) | Ratio of intermediate mesopores (1) (%) | 62 | 61 | 36 | 47 | 42 | 79 |
| | | (iii)/(ii) | Ratio of intermediate mesopores (2) (%) | 71 | 69 | 57 | 59 | 47 | 80 |
| | | (ii)/(i) | Ratio of mesopores (%) | 87 | 88 | 63 | 80 | 91 | 99 |
| | | (iv)/(i) | Ratio of enlarged mesopores (%) | 16 | 12 | 8 | 9 | 9 | 9 |
| | | (v)/(i) | Ratio of macropores (%) | 13 | 13 | 37 | 21 | 10 | 2 |

Examples 3 and 4 and Comparative Examples 5 to 8

Method of Hydrocracking Heavy Oil

Catalysts I to VI for hydrocracking of heavy oil described above were evaluated for their hydrocracking performance. Table 3 shows the results.

Note that the method of hydrocracking is such a method that any one of Catalysts I to VI for hydrocracking of heavy oil is filled in an amount of 100 cc in a high-pressure, fixed-bed reactor, followed by sulfurization treatment, and then hydrocracking treatment is carried out under the following condition by using an atmospheric residue of Arabian heavy exhibiting the properties shown in Table 2 as a raw material oil.

<<Hydrocracking Condition>>

| | |
|---|---|
| Temperature of reaction (WAT: weight-average temperature) | 400° C. |
| Liquid hour space velocity (LHSV) | 0.3 h$^{-1}$ |
| Partial pressure of hydrogen | 13 MPa |
| Hydrogen/oil ratio | 1000 Nm$^3$/kiloliter |

A product oil obtained by the above-mentioned hydrocracking treatment (hereinafter, may be simply referred to as a product oil) was analyzed in accordance with Chromatographic Distillation Method (ASTM D5307-97). As a result, determined were the yields of respective fractions such as the fraction having a boiling point of higher than 343° C. and 525° C. or lower (343+° C.), the fraction having a boiling point of higher than 525° C. (a boiling point of 525+° C.), and the fraction having the range of a boiling point of 150 to 343° C., which is the kerosene and gas oil fraction as the middle distillates. Then, the 343+° C. conversion and the 525+° C. conversion defined in the following were determined. The results are shown in Table 3. Greater values of the yield of the middle distillates and conversion mean greater hydroconversion of the catalyst for hydrocracking of heavy oil.

The raw material oil in the following definitions is the atmospheric residue of Arabian heavy shown in Table 2.

343+° C. conversion (% by mass)=(residual fraction in raw material oil-residual fraction in product oil)/residual fraction in raw material oil 525+° C. conversion (% by mass)=(vacuum residue fraction in raw material oil-residual fraction in product oil)/vacuum residue fraction in raw material oil Further, desulfurization activity, denitrogenation activity, carbon residue removal activity, asphaltene removal activity, and metal removal activity were evaluated in accordance with the measurement methods and definitions described below and the value of each activity was calculated by conventional methods. The results are shown in Table 3.

Further, the product oil obtained by the above-mentioned hydrocracking treatment (hereinafter, may be simply referred to as the product oil) was used to measure its content of sulfur in accordance with the radiation excitation method (JIS K 2541-4), its content of nitrogen in accordance with the chemiluminescence method (JIS K 2609), its vanadium content and nickel content in accordance with the fluorescent X-ray method (JPI-5S-62-2000), the content of components insoluble in heptane (C7) in accordance with the method of UOP 614-80, and the content of carbon residue in accordance with the micro method (JIS K 2270). The atmospheric residue of Arabian heavy shown in Table 2 (hereinafter, may be simply referred to as a raw material oil) was evaluated in accordance with the same methods except that the content of sulfur was measured in accordance with a combustion tube method with air (JIS K 2541-3).

Desulfurization activity (% by mass)=(content of sulfur in raw material oil-content of sulfur in product oil)/content of sulfur in raw material oil Denitrogenation activity (% by mass)=(content of nitrogen in raw material oil-content of nitrogen in product oil)/content of nitrogen in raw material oil Carbon residue removal activity (% by mass)=(content of carbon residue in raw material oil-content of carbon residue in product oil)/content of carbon residue in raw material oil Asphaltene removal activity (% by mass)=(content of components insoluble in C7 in raw material oil-content of components insoluble in C7 in product oil)/content of components insoluble in C7 in raw material oil Metal removal activity (% by mass)=(sum of contents of V and Ni in raw material oil-sum of contents of V and Ni in product oil)/sum of contents of V and Ni in raw material oil

TABLE 2

| | Item | Unit | Measurement value | Standard |
|---|---|---|---|---|
| Property | Content of sulfur (combustion tube method) | % by mass | 4.42 | JIS K 2541-3 |
| | Content of nitrogen (chemiluminescence method) | ppm by mass | 2720 | JIS K 2609 |
| | Vanadium | ppm by mass | 86 | JPI-5S-62-2000 |
| | Nickel | ppm by mass | 27 | JPI-5S-62-2000 |
| | Content of component insoluble in heptane | % by mass | 7.9 | UOP 614-80 |
| | Conradson carbon residue (CCR) | % by mass | 14.1 | JIS K 2270 |
| | Density (vibration-type method) @15° C. | g/cm$^3$ | 0.9939 | JIS K 2249 |
| | Kinetic viscosity (general): @50° C. | mm$^2$/s | 3070 | JIS K 2283 |
| | Hcont. (Hydrogen concentration) | % by mass | 10.86 | JPI-5S-65-2004 |
| Fraction distribution | Naphtha fraction (C5-150° C.) | % by mass | 0.0 | Chromatographic Distillation Method |
| | Kerosene fraction (150-250° C.) | % by mass | 0.0 | |
| | Gas oil fraction (250-343° C.) | % by mass | 3.3 | |
| | Vacuum gas oil fraction (343-525° C.) | % by mass | 36.7 | ASTM D 5307-97 |
| | Residual fraction (343+° C.) | % by mass | 96.7 | |
| | Vacuum residue fraction (525+° C.) | % by mass | 60.0 | |

*Arabian heavy atmospheric residue (AR-AH)

TABLE 3

|  |  | Example 1 | Example 2 | Comparative Example 1 | Comparative Example 2 | Comparative Example 3 | Comparative Example 4 |
|---|---|---|---|---|---|---|---|
| [Result of hydrocracking reaction] | | | | | | | |
| 343+° C. conversion | % by mass | 35 | 34 | 47 | 31 | 29 | 26 |
| 525+° C. conversion | % by mass | 52 | 53 | 49 | 47 | 51 | 45 |
| Yield of middle distillates (150-343° C.) | % by mass | 25 | 26 | 28 | 25 | 23 | 23 |
| [Catalytic activity] | | | | | | | |
| Desulfurization activity | % by mass | 91 | 91 | 81 | 86 | 87 | 92 |
| Denitrogenation activity | % by mass | 68 | 70 | 49 | 59 | 70 | 74 |
| Carbon residue removal activity | % by mass | 70 | 67 | 55 | 61 | 65 | 72 |
| Asphaltene removal activity | % by mass | 71 | 65 | 75 | 73 | 62 | 70 |
| Metal removal activity | % by mass | 77 | 70 | 82 | 75 | 63 | 75 |

INDUSTRIAL APPLICABILITY

The catalyst for hydrocracking of heavy oil of the present invention can be used as a catalyst for hydrocracking excellent in both functions of cracking activity and desulfurization activity by striking a balance between the cracking activity and desulfurization activity. Thus, the catalyst for hydrocracking of heavy oil can be widely used as a useful catalyst for hydrocracking.

The invention claimed is:

1. A catalyst for hydrocracking of heavy oil, comprising a support which includes a crystalline aluminosilicate and a porous inorganic oxide excluding the crystalline aluminosilicate, with an active metal being supported on the support, wherein
   (a) the support comprises the crystalline aluminosilicate in an amount of 45% by mass or greater and smaller than 60% by mass and the porous inorganic oxide excluding the crystalline aluminosilicate in an amount of greater than 40% by mass and 55% by mass or smaller, based on a sum of an amount of the crystalline aluminosilicate and an amount of the porous inorganic oxide excluding the crystalline aluminosilicate,
   (b) the active metal is at least one kind of metal selected from metals belonging to Groups 6, 8, 9, and 10 of the Periodic Table, and
   (c) the catalyst for hydrocracking of heavy oil has a distribution of pores in which an entire pore volume of pores defined as pores having a diameter of 5 to 1000 nm is 0.40 dm$^3$/kg or greater, a volume of intermediate mesopores having a diameter of 10 nm or larger and smaller than 20 nm accounts for 60% or greater of the entire pore volume, and the pore volume of macropores defined as pores having a diameter of larger than 50 nm and 1000 nm or smaller accounts for 10% or greater of the entire pore volume.

2. The catalyst for hydrocracking of heavy oil according to claim 1, wherein the catalyst for hydrocracking of heavy oil comprises enlarged mesopores having a diameter of 20 to 50 nm, whose volume accounts for 10% or greater and 20% or smaller of the entire pore volume.

3. The catalyst for hydrocracking of heavy oil according to claim 1, wherein the catalyst for hydrocracking of heavy oil comprises intermediate mesopores having a diameter of 10 nm or larger and smaller than 20 nm, whose volume accounts for greater than 65% and 75% or smaller of a mesopore volume, which is a pore volume of pores defined as pores having a diameter of 5 to 50 nm.

4. The catalyst for hydrocracking of heavy oil according to claim 1, wherein the mesopore volume accounts for 85 to 90% of the entire pore volume.

5. The catalyst for hydrocracking of heavy oil according to claim 1, wherein the support used for the catalyst for hydrocracking of heavy oil has an average pore diameter of 14 nm or greater and mesopores defined as pores having a diameter of 5 to 50 nm show a maximum value of 13 to 15 nm.

6. The catalyst for hydrocracking of heavy oil according to claim 1, wherein the crystalline aluminosilicate comprises one of an ultrastable Y-type zeolite and an ultrastable Y-type zeolite supporting a metal.

7. The catalyst for hydrocracking of heavy oil according to claim 1, wherein the porous inorganic oxide excluding the crystalline aluminosilicate comprises, as a main component, alumina which is produced via a process in which an alumina hydrate (boehmite gel) is obtained as an intermediate through a neutralization reaction of an aqueous solution containing an aluminum salt, the alumina hydrate showing a relative peak high of boehmite crystals following equation (1) of 65 to 85 which is a value obtained by X-ray diffraction analysis (XRD), $$\text{Relative peak height} = (B/A) \times 100 \tag{1},$$

wherein B represents the measured value of the peak high of the boehmite crystals of the alumina hydrate, and A represents the measured value of the peak high of boehmite crystals of a standard substance at 2θ: 10° to 20°, wherein the standard substance has the following characteristics:
Composition: $Al_2O_3$: 76%, $Na_2O$: 0.002%,
Loose bulk density: 700 to 800 g/l,
Packed bulk density: 800 to 1100 g/l,
Particle size ($d_{50}$): 40 μm,
Surface area (BET specific surface area): 220 m$^2$/g,
Pore volume: 0.55 ml/g, and
Crystallite Size: 7.0 nm.

8. A hydroprocessing method for heavy oil, comprising a process of contacting a catalyst for hydrocracking of heavy oil with a composition comprising a heavy oil or residue thereof,
   wherein
   (a) the support comprises the crystalline aluminosilicate in an amount of 45% by mass or greater and smaller than 60% by mass and the porous inorganic oxide excluding the crystalline aluminosilicate in an amount of greater than 40% by mass and 55% by mass or smaller, based on a sum of an amount of the crystalline aluminosilicate and an amount of the porous inorganic oxide excluding the crystalline aluminosilicate, (b) the active metal is at least one kind of metal selected from metals belonging to Groups 6, 8, 9, and 10 of the Periodic Table, and (c) the catalyst for hydrocracking of heavy oil has a distribution of pores in which an entire pore volume of pores defined as pores having a diameter of 5 to 1000 nm is 0.40 dm$^3$/kg or greater, a volume of intermediate mesopores having a diameter of 10 nm or larger and smaller than 20 nm accounts for 60% or greater of the entire pore volume, and the pore volume of macropores defined as pores having a diameter of larger than 50 nm and 1000 nm or smaller accounts for 10% or greater of the entire pore volume.

9. The hydroprocessing method according to claim 8, wherein the porous inorganic oxide excluding the crystalline aluminosilicate comprises alumina as a main component.

10. The hydroprocessing method according to claim 9, wherein the alumina is produced via following steps (i) and (ii), and (i) a step of obtaining an alumina hydrate (boehmite) having a pH of 6 to 11 by carrying out a reaction between an aqueous solution containing an aluminum salt and a neutralizer, (ii) a steps of washing, aging, drying, and kneading the resultant alumina hydrate, the alumina hydrate showing a relative peak high of boehmite crystals following equation (1) of 65 to 85 which is a value obtained by X-ray diffraction analysis (XRD), $$\text{Relative peak high} = (B/A) \times 100 \quad (1)$$

wherein B represents the measured value of the peak high of the boehmite crystals of the alumina hydrate, and A represents the measured value of the peak high of boehmite crystals of a standard substance at 2θ: 10° to 20°, wherein the standard substance has the following characteristics:

Composition: $Al_2O_3$: 76%, $Na_2O$: 0.002%,
Loose bulk density: 700 to 800 g/l,
Packed bulk density: 800 to 1100 g/l,
Particle size (do): 40 μm,
Surface area (BET specific surface area): 220 m$^2$/g,
Pore volume: 0.55 ml/g, and
Crystallite Size: 7.0 nm.

11. The hydroprocessing method according to claim 10, using aluminum sulfate as the aluminum salt, and residual amount of sulfate ($SO_4^{2-}$) in the alumina hydrate after washing is 1% by mass or smaller.

* * * * *